United States Patent Office 2,835,638
Patented May 20, 1958

2,835,638

MANUFACTURE OF CATALYTIC MATERIALS

Herman S. Bloch, Chicago, and George L. Hervert, Downers Grove, Ill., assignors to Universal Oil Products Company, Des Plaines, Ill., a corporation of Delaware No Drawing. Application July 27, 1953
Serial No. 370,621

16 Claims. (Cl. 252—442)

This invention relates to the manufacture and use of catalytic materials and more particularly to a novel method of preparing alumina-containing catalysts.

Alumina, either as the hydrate or the anhydrous form as aluminum oxide, is widely used in many phases of the chemical and petroleum industries. It has been employed in the petroleum industry as a catalyst for hydrocarbon conversion processes, as a support for catalytically active materials to be used in hydrocarbon conversion processes and as a dehydrating agent. It is widely used in other industries for the same purposes. The activated forms, which are considered to be merely various physical modifications of aluminum oxide, are especially known for their pronounced catalytic activity and adsorptive capacity. The use of alumina as a refractory is also well known. Alumina in the form of corundum has been found suitable for use in the manufacture of certain types of refractory and ceramic materials. In other uses alumina is mixed or compounded with other compounds to produce a wide variety of substances of useful properties.

In the specification and claims the word alumina will mean either anhydrous alumina or alumina hydrate or aluminum hydroxide unless otherwise specifically noted. Percentages of the other catalytic components based on the alumina refer to dried or anhydrous alumina, that is, alumina free of water.

In one embodiment our invention relates to a method of preparing a catalyst which comprises reacting aluminum with water in the presence of a catalytic amount of a mercury promoter and an acidic compound selected from the group consisting of inorganic acids, polyvalent organic acids and acid-acting salts in amount so that the monovalent acid anion is in amount below about 0.13 equivalent of acid anion per equivalent of aluminum and the bivalent inorganic acid anion is in amount below about 0.50, thereby forming alumina, and combining therewith a catalytic component selected from the group consisting of the metals and compounds of the metals in group VIII of the periodic table, and mixtures thereof.

In another embodiment the present invention relates to a method of preparing a catalyst which comprises reacting aluminum with water in the presence of a mercury promoter in the amount of from about 0.05% to about 50% by weight of said aluminum and an acidic compound selected from the group consisting of inorganic acids, polyvalent organic acids and acid-acting salts in amount so that the monovalent acid anion is in amount below about 0.13 equivalent of acid anion per equivalent of aluminum and the bivalent inorganic acid anion is in amount below about 0.50, agitating the mixture to form an alumina gel, combining a halogen therewith in an amount of from about 0.1% to about 8% by weight of said alumina on a dry basis and combining platinum therewith in an amount of from about 0.01% to about 1% by weight of said alumina on a dry basis.

In a specific embodiment the present invention relates to a method of preparing a catalyst which comprises reacting aluminum with water in the presence of a mercury promoter in the amount of from about 0.05% to about 50% by weight of said aluminum and an acidic compound selected from the group consisting of inorganic acids, polyvalent organic acids and acid-acting salts in amount so that the monovalent acid anion is in amount below about 0.13 equivalent of acid anion per equivalent of aluminum, the bivalent inorganic acid anion is in amount below about 0.50, the bivalent organic acid anion is in amount below about 1.0, and the amount of trivalent acid anion is in amount below about 1.0, at a temperature of from about 30° F. to about 705° F., at a pressure sufficient to maintain at least a portion of the water in the liquid phase, agitating the mixture to form alumina, combining a halogen therewith in an amount of from about 0.1% to about 8% by weight of said alumina on a dry basis, calcining said alumina-halogen composite at a temperature of from about 600° F. to about 1600° F., and combining platinum therewith in an amount of from about 0.01% to about 1% by weight of said alumina on a dry basis.

In another specific embodiment the present invention relates to a process for reforming a gasoline fraction which comprises subjecting said gasoline to contact at reforming conditions with a catalyst prepared by reacting aluminum with water in the presence of a mercury promoter in the amount of from about 0.05% to about 50% by weight of said aluminum, and an acidic compound selected from the group consisting of inorganic acids, polyvalent organic acids and acid-acting salts in amount so that the monovalent acid anion is in amount below about 0.13 equivalent of acid anion per equivalent of aluminum and the bivalent inorganic acid anion is in amount below about 0.50, at a temperature of from about 30° F. to about 705° F., at a pressure sufficient to maintain at least a portion of the water in the liquid phase, agitating the mixture to form alumina, combining a halogen therewith in an amount of from about 0.1% to about 8% by weight of said alumina on a dry basis, calcining said alumina-halogen composite at a temperature of from about 600° F. to about 1600° F., combining platinum therewith in an amount of from about 0.01% to about 1% by weight of said alumina on a dry basis and calcining.

The usual commercial method of producing alumina is by purifying ores in which the oxide is present. Another method is by the precipitation of aluminum hydroxide from its salts. The preparation of alumina as at present practiced entails the addition of a basic reagent to aluminum chloride hexahydrate. The resultant precipitate is washed and filtered to remove undesirable impurities. In a recently discovered process referred to in the art as "platforming," the catalyst contains very small amounts of activating components. This means that the alumina, which comprises a major proportion of the catalyst, must be thoroughly washed to remove undesirable impurities because the presence of even small amounts of impurities may prove detrimental to the activity and other properties of the catalyst. For example, when the catalyst contains 0.1% to 0.5% of activating components, the presence of impurities within a similar or lesser range will tend to mask or off-set the effect of the activating components.

When alumina is prepared from the commercially available aluminum chloride hexahydrate, the precipitated alumina requires extensive washing and filtration in order to remove the impurities, including excess chloride. The present invention offers a novel method of preparing alumina which eliminates the need for washing and filtration and thereby reduces the time and expense hereinbefore entailed in purifying the alumina.

Using the conditions and catalyst of our invention the alumina is produced either as a gel or as crystals of alumina. At temperatures of from about 30° F. to about 400° F. the gel is favored while at temperatures of from about 400° F. to about 705° F. crystals of alumina are usually produced. The limits at which a gel is produced, therefore, are from about 30° F. to about 400° F., although alumina is produced within the broader range of from about 30° F. to about 705° F.

We have now discovered and our invention broadly comprises an improved method of preparing alumina-containing catalysts. One of the steps comprises reacting aluminum with water under specific conditions. Hydrogen in a very pure state is produced as a by-product of this reaction.

The aluminum to be used in our process can be any substantially pure aluminum, although if a high purity alumina product is desired it is preferable to start with high purity aluminum. It is also within the scope of this invention to use certain aluminum alloys; however since the present process will produce very pure alumina, it is a preferred embodiment of the present invention to react aluminum of preferably 99.5+% purity with water to produce a high purity alumina product. The presence of some alloying metals is undesirable, since they appear to inhibit the reaction of aluminum with water.

The degree of subdivision of the aluminum is also another factor determining the rate of the reaction. The smaller the size of the particles, the greater the surface area of aluminum exposed to the water for reaction; a powdered aluminum is therefore excellent. Granulated or pelleted aluminum, or aluminum in ribbon form is also suitable; however, the larger the particle size of the aluminum metal charge the longer the time required for complete reaction. In general, pellicles of not more than about an inch in greatest dimension are satisfactory, although those of less than about ½ inch average size are preferred. Aluminum pellets prepared by dropping molten aluminum into water have proven to be very satisfactory. The epsilon-alumina which forms rapidly on aluminum surfaces and acts as a coating which normally passivates aluminum does not effectively inhibit reaction under the conditions herein disclosed.

One embodiment of the present invention comprises agitating the aluminum and water and catalytic substances sufficiently so that the reaction to produce alumina proceeds at a desirable rate. The reaction velocity is dependent upon the temperature of the reactants, the degree of subdivision of the aluminum, the concentration or amount of the mercury promoter and the degree of agitation given the mixture. Thus a reaction that proceeds slowly at a temperature of 212° F. with only a mild agitation or shaking of the mixture will proceed very rapidly if the mixture is vigorously agitated. At a temperature of 572° F., on the other hand, the reaction proceeds relatively rapidly even with a mild degree of agitation. However, if the mixture is subjected to vigorous agitation, the time necessary for complete reaction is substantially decreased.

A preferred step in the manufacture of the catalysts is the step of producing hydrated alumina gel which comprises reacting aluminum with water in the presence of certain catalytic substances, agitating the mixture to form alumina, maintaining a pressure sufficient to keep at least a portion of the water in the liquid phase, and separately recovering alumina therefrom.

It is a desirable feature of the present invention that liquid water be present and it is thus necessary when temperatures above the boiling point are employed to effect the reaction under sufficient pressure to maintain a liquid phase of water. The critical temperature of water is 705.2° F.; the definition of the critical temperature being that temperature above which a gas cannot be liquefied by pressure alone. It is desirable to use liquid water since it is much easier to have intimate contact and especially mixing between the aluminum and water accomplished if there is a liquid phase.

The catalytic substance used in this reaction is a mixture of a mercury promoter and an acidic compound. The mixture acts as an accelerant to speed the reaction of aluminum with water in order to form the desired alumina. We have found that the mercury compound reacts with the aluminum and is reduced to metallic mercury which then appears to amalgamate with the aluminum. There is a difference in the catalytic effect of the various compounds of mercury, and it seems likely that the distribution of the mercury amalgam centers (which are probably cathodic) is an important factor in determining the reaction velocity. However, we do not intend our invention to be limited by this theory. A comparison between the speed of the reaction when metallic mercury is used as a promoter and a proportional amount of a mercury compound shows some advantage for the mercury compound, although metallic mercury is itself quite effective.

As mentioned, the mercury compound reacts with the aluminum to produce metallic mercury; for example, mercuric oxide reacts with the aluminum to produce alumina and metallic mercury. Other compounds react in a similar manner, although they do not all produce equal reaction velocities when used in equivalent amounts.

The exact roll of the acidic compound that is used is not certain; however, it is believed that the acid anions may, by the formation of partial salts, solubilize the surface coating of alumina that is formed by the reaction of aluminum with water, causing the aluminum compound to enter into solution and expose more aluminum surface. In solution the soluble aluminum compound may by hydrolysis form alumina and regenerate the acid anions. Again, we do not intend our invention to be limited by this theory. Reactions as herein described are accelerated in the presence of a catalytic amount of an acid, and therefore, these acids are herein referred to as catalytic substances.

The mildly acidic solution may be achieved in several ways. For example, small amounts of mineral acids, organic acids or acid-acting salts may be used. Suitable mineral acids comprise the monobasic acids hydrogen fluoride, hydrogen chloride, hydrogen iodide, hydrogen bromide, nitric acid; the bivalent acid sulfuric acid; and the trivalent acid phosphoric acid, etc. Suitable organic acids are the polybasic acids such as for example, oxalic acid, malonic acid, succinic acid, maleic acid, phthalic acid, tartaric acid, citric acid, etc. These polybasic acids result in the desirable gel formation, whereas the lower, water-soluble monobasic fatty acids do not. The acid-acting salts comprise the halide salts, for example, ammonium chloride, ammonium fluoride, aluminum chloride, aluminum fluoride, etc. For purposes of gel formation, as hereindescribed, the acid or acid-acting salt or mixtures thereof must be selected in amounts so that the acid anion/aluminum ratio be in terms of stoichiometric weight equivalents, as herein set forth. The acid anion is present from the acid and/or the acid-acting salt. The monobasic inorganic acids produce gels when the ratio of monovalent acid anion is in amounts below 0.13 equivalent of acid anion per equivalent of aluminum, while the bivalent inorganic acid anion is in amounts such that the ratio is below about 0.5. The polyvalent acid anions produce gels with a higher ratio of bivalent acidic anion of below 1.0 equivalent of acid anion per equivalent of aluminum and higher, however, ratios below about 1.0 are preferred since ratios greater thaan 1.0 involve the use of excess free acid anion. For example sulfuric acid forms gels with $SO_4^=/Al^{+++}$ ratios of below about 0.5 equivalent of acid anion per equivalent of aluminum while the corresponding maximum for $Cl^-/Al^{+++}$ is about 0.13. The acid for gel formation is selected from the group consisting of inorganic acids, polybasic or polyvalent organic acids and acid-acting salts in amount so that the monovalent acid is in amount below about 0.13 equivalent of acid anion per equivalent of aluminum, the bivalent inorganic acid anion is in amount below about 0.50, the bivalent organic acid anion is in amount below about 1.0 and the amount of trivalent acid anion is in amount below about 1.0. The bivalent organic acid anions and higher valent organic and inorganic acid anions form gels above the 0.50 ratio of the dibasic inorganic acids with gels being formed using ratios as high as 5.0, however, ratios much above 1.0 are not preferred since ratios above 1.0 involve the use of excess free acid. Ratios below about 0.01 of any of the acid anions do not effectively catalyze the desired reaction.

Since the mercury promoter acts as an accelerator or a catalyst, it is preferably used in very low concentrations. Any amount of a promoter used as an accelerant or catalyst herein mentioned, will be a catalytic amount or referred to as a catalytic amount. The amount of the mercury promoter used will usually be within the range of from about 0.01% to about 50% by weight of the aluminum. Concentrations of mercury promoter and acidic compound below these ranges do not effectively catalyze the reaction and concentrations above this range often produce undesirable results.

The mercury promoter is selected from the following group and may be one or a mixture of two or more of these mercury promoters: Mercury, mercuric acetate, mercurous acetate, mercuric benzoate, mercuric bromate, mercurous bromate, mercuric bromide, mercurous bromide, mercuric bromide iodide, mercurous carbonate, mercuric chlorate, mercuric chloride, mercurous chloride, mercuric fluoride, mercurous fluoride, mercuric iodide, mercuric nitrate, mercurous nitrate, mercuric oxalate, mercuric oxide, mercurous oxide, mercuric sulfate, mercurous sulfate, etc., as well as mercury-nitrogen compounds such as ammono-basic mercuric bromide, ammono-basic mercuric chloride, etc. Almost any other mercury-containing compound may be used and as hereinbefore set forth, may be mercuric salts, mercurous salts, either organic or inorganic, the oxides of mercury as well as complexes of mercury compounds.

Much has already been made of the fact that it is preferable to use a liquid phase of water and therefore, the preferred upper limit of temperature that the reaction may proceed at is the critical temperature of water of about 705° F. The reaction requires increasingly longer periods of time as the temperature of the reaction is decreased and, where the time of the reaction is not important, it is possible to effect the reaction at temperatures down to the freezing point of the water and promoter solution, that is, about 32° F. or lower, although the reaction is quite slow at such low temperatures. Thus, the temperature range in which the reaction between aluminum and water in the presence of a caatlyst is effected is from about 30° F. to about 705° F.

Drying the alumina gel at various temperatures produces alumina in various modifications. Drying within the temperature range of from about 30° F. to about 400° F. produces mainly gibbsite alumina. An analysis of the alumina dried at 400° F. shows that the product is chiefly gibbsite, however, traces of boehmite, another modification of hydrated alumina, are evidenced. As the temperature of the drying is increased, the percent of boehmite in the product is accordingly increased and at a temperature of approximately 650° F., the product after the drying is analyzed as being almost entirely boehmite.

The alumina producing reaction may be effected in any suitable type of equipment wherein the reactants are subjected to agitation and preferably to vigorous stirring. The operation may be carried out in continuous or batchwise fashion. When temperatures above the normal boiling point of water are employed and the reaction is performed with water in the liquid phase, it is of course necessary that the reaction vessel be capable of withstanding pressures sufficient to maintain a liquid phase of water. In small scale production of alumina by this process, a rotating pressure autoclave is satisfactory. When the temperatures employed are at or below the boiling point of water, the reaction may be effected in ordinary open equipment in which a means is provided for vigorous stirring, agitation, or circulation of the reactants. It is, however, necessary that the process equipment be constructed of such materials that they are not affected by water or aluminum and/or the promoters used so that undesirable elements are not introduced into the desired alumina product. However, if the presence of these foreign substances is not objectionable the above precautions need not be adhered to. Hydrogen is produced as a by-product of the reaction and a means of venting must be provided if the pressure build-up caused by the production of this hydrogen is to be avoided. If the equipment will withstand this additional pressure, however, it is not necessary to vent the hydrogen continuously.

The alumina prepared in accordance with the present invention does not need further washing and/or filtering before being composited with the other components of the catalyst especially where there is a calcination of the alumina or the alumina-halogen composite before further impregnation. The elimination of the washing and filtering of the alumina considerably reduces the cost of the manufacture of the catalyst, not only in time and effort saved in effecting these operations, but also in a considerable saving in the cost of the washing and filtering equipment.

When all of the aluminum has been dissolved it is found that the mercury settles out in the form of metallic globules or a metallic pool (depending upon the amount present) which may be easily recovered for re-use as such or for conversion to the catalytic mercury salts being employed.

After the alumina has been prepared it may be partially dried at a temperature of from about 200° F. to about 500° F. for a period of 2 to 24 hours or more and then is further composited with the other components of the catalyst.

The alumina, before or after drying may be composited with silica, and/or titania, and/or boron oxide. This oxide composite may further be composited with an active catalyst component such as a component selected from group VIII of the periodic table and more specifically, platinum.

More specifically, the alumina may be further used to prepare a "platforming" catalyst. The "platforming" catalyst comprises an association of alumina, platinum and halogen, the halogen and platinum being combined with each other and/or with the alumina. The catalyst contains from about 0.01% to about 1% by weight of platinum and from about 0.1% to about 8% by weight of halogen, preferably from about 0.1% to about 3% by weight being combined fluorine.

In another embodiment the halogen content of the catalyst comprises a mixture of fluorine and chlorine, the total amount of halogen being within the range of from about 0.1% to about 8% by weight of the alumina.

The halogen may be added to the catalyst in any suitable manner and either before or after drying of the alumina. While the halogen may be utilized as such, it generally is preferred to utilize the halogen as an aqueous solution of the hydrogen halide for ease in handling. In the preferred method the halogen is added to the refractory oxide before the other components are composited therewith. The halogen is preferably incorporated into the alumina before forming into particles and this may be accomplished by the use of an acid such as hydrogen fluoride, hydrogen chloride, hydrogen bromide, and/or hydrogen iodide. In some cases volatile salts, such as ammonium fluoride, ammonium chloride, etc. may be employed. In any event, the amount of halogen will be in the range of from about 0.1% to about 8% by weight of the final catalyst. Chemically combined fluorine appears to be more advantageous and is preferably used within the range of from about 0.1% to about 3% by weight of the final catalyst on a dry basis. The chloride content is normally within the range of from about 0.1% to about 8% and preferably from about 0.2% to about 5% by weight of the final catalyst on a dry basis.

In a preferred embodiment of the invention platinum is composited with the catalyst, generally in an amount of from about 0.01% to about 1% by weight of the catalyst. Platinum is a particularly desirable metal component to be incorporated into the catalyst since catalysts containing low concentrations of platinum have been found to be very active, especially when the catalyst is to be used in reforming operations. The metal selected from the platinum group may be composited into the catalyst in any suitable manner. When platinum is the selected active metal component, one method of introduction is to form a separate solution of chloroplatinic acid and water and to introduce hydrogen sulfide into this solution at room temperature until the chloroplatinic acid solution reaches a constant coloration, that is, there will be no change in color upon addition of more hydrogen sulfide. A chloroplatinic acid solution is normally light yellow and upon addition of hydrogen sulfide gas turns to a dark brown color. Apparently the chloroplatinic acid and hydrogen sulfide react to form one or more complexes or chemical compounds. The brown solution of chloroplatinic acid and hydrogen sulfide may then be commingled with the other components of the catalyst as hereinbefore set forth.

Another method of introducing the platinum into the catalyst is to form a separate aqueous solution of chloroplatinic acid and add ammonium hydroxide to give a starting solution having a pH between the range of from about 5 to about 10. This solution is then commingled with the other components of the catalyst. Although the platinum is preferably introduced as a solution of chloroplatinic acid, other suitable platinum solutions may be employed, such as solutions, colloidal solutions or suspensions of platinum-cyanide, platinum-hydroxide, platinum-oxide, platinum-sulfide, etc. In cases where these solutions are not soluble in water at the temperature used, other suitable solvents such as alcohols, ethers, etc. may be utilized. The platinum appears to enter into a peculiar association with the other components of the catalyst and the composite thereby acquires the ability to improve the antiknock characteristics of the product obtained in the process. While platinum and compounds of platinum are preferred components, it is understood that other suitable components selected from the metals and compounds of the metals of group VIII may be employed. These other components may include, although not necessarily with equivalent results, the metals and compounds of nickel, cobalt, ruthenium, rhodium, osmium, iridium, and palladium, etc. or mixtures of two or more of these metals. The concentration of the metal component selected from group VIII will vary according to the particular component selected and the conversion process in which it is to be used, however, the concentration generally will lie within the range of from about 0.01% to about 10% by weight (calculated as the metal) of the final catalyst. The concentration of platinum will lie within the range of from about 0.01% to about 1% by weight (calculated as the metal) of the final catalyst.

The catalyst composite, before or after all of the components of the catalyst are present therein, is usually subjected to a high temperature treatment. The composite of alumina and halogen may be subjected to a high temperature treatment or calcination before the other components of the catalyst are composited therewith. The heating is conducted at a temperature of from about 600° F. to about 1600° F., but usually not in excess of 1400° F. After the addition of the compound of the metal selected from group VIII of the periodic table, the usual calcination temperature is from about 600° F. to about 1200° F. and preferably not above 1100° F. The heat treatment or calcination may be conducted in an oxidizing atmosphere, a reducing atmosphere such as hydrogen, methane, etc. or inert atmosphere such as nitrogen, etc., but is usually conducted in air or other oxygen-containing gas. In some cases the calcination may take place in air followed by heat treatment in the presence of hydrogen or the reverse procedure may be used. The preferred heating periods are from about 2 to 8 hours or more.

Although the catalyst of the present invention will have a long life, it may be necessary to regenerate the catalyst after long periods of service. The regeneration may be effected by treatment with air or other oxygen-containing gas to burn the carbonaceous matter therefrom. In general it is preferred to control the regeneration temperature not to exceed about 1200° F.

As hereinbefore set forth, these catalysts are particularly suitable for use in the reforming of gasoline or fractions thereof. The exact operating conditions depend upon the character of the charging stock, as well as the activity of the catalyst being used; however, the conditions will be in the ranges herein specified. The reforming is preferably effected in the presence of hydrogen which may be introduced from an extraneous source or recycled from within the process. In the preferred mode of operation sufficient hydrogen is produced and recycled so that no extraneous source of hydrogen is necessary. A hydrogen to hydrocarbon mol ratio of from about 0.5 to about 20 or more mols of hydrogen per mol of hydrocarbon is used.

Processes using the catalyst of the present invention may be effected in any suitable equipment. The catalyst may be deposited as a fixed bed in a reactor and the hydrocarbons to be treated are passed therethrough in either upward or downward flow. The catalyst may be used in a fluidized type of operation in which the catalyst and hydrocarbons are maintained in a state of turbulence under hindered settling conditions, or a fluidized fixed bed type of operation may be used in which the catalyst and hydrocarbons are maintained in a state of turbulence under hindered settling conditions but where catalyst is not withdrawn from, or introduced into the reaction zone during the processing cycle. The catalyst may also be used in the moving bed type of process in which the catalyst and hydrocarbons are passed either in concurrent or countercurrent flow through a reaction zone and the catalyst may also be used in the suspensoid type of operation in which the catalyst and hydrocarbons are passed as slurry through the reaction zone. The reactants from any of the hereinbefore mentioned reaction zones are normally subjected to a further treatment such as the stabilization of the product to separate normally gaseous products therefrom and to obtain a final reformed product of the desired volatility and vapor pressure.

While the catalyst of the present invention is particularly suitable for reforming gasoline, it is understood that this novel catalyst may be utilized for the conversion of other hydrocarbon fractions. Thus the catalyst may be used for the dehydrogenation of selected hydrocarbon fractions such as naphthenes to produce aromatics, the dehydrogenation of paraffins to produce the corresponding olefins, the dehydrogenation of mono-olefins to diolefins, etc. The catalyst may also be utilized to effect dehydrocyclization reactions such as the conversion of normal hexane to benzene. The catalyst may also be used for effecting isomerization reactions, and hydrogenation reactions including both non-destructive hydrogenation and destructive hydrogenation. In still another embodiment the catalyst of the present invention may be used for effecting oxidation of hydrocarbons to form the corresponding oxygenated derivatives and for desulfurizing sulfur-containing fractions.

The catalyst, however, is particularly suitable for use in reforming processes. The petroleum fraction that is upgraded in reforming may be a full boiling range straight run gasoline having an initial boiling point within the range of from about 50° F. to about 100° F. and an end boiling point within the range of from about 350° F. to about 425° F., or any selected fraction thereof. It may also be a natural gasoline as obtained from the refining of natural gases or it may be any selected fraction of the natural gasoline. The natural gasoline or the natural gasoline fraction will have an initial boiling point and an end boiling point substantially the same as that of the straight run gasoline hereinbefore described. The catalyst of the present invention may also be applied to the reforming of cracked gasoline or mixtures of cracked and straight run and/or natural gasoline. Reference to gasoline in the present specification, therefore, means a full boiling range gasoline or any fraction thereof and also that the gasoline fraction may contain components boiling above the gasoline range.

One of the major purposes of the reforming reaction is to increase the octane number of the charging stock. The catalyst of the present invention substantially increases the octane number of the charge and furthermore the yield-octane number relationships are better than have heretofore been realized.

The conditions at which the gasoline or gasoline fraction is reformed will depend upon the particular catalyst as well as the feed stock and the products desired. The processing temperatures will ordinarily be within the range of from about 600° F. to about 1100° F. In general, pressures of from about 50 to about 1000 lbs. per sq. inch are satisfactory. The process is usually conducted at a weight hourly space velocity of from about 0.5 to about 20 or more and in the presence of hydrogen at a mol ratio of from about 0.5 to about 20 or more mols of hydrogen per mol of hydrocarbon.

The following examples are given to illustrate our invention, but are not given for the purpose of unduly limiting the generally broad scope of the present invention.

EXAMPLE I

A catalyst was prepared as follows. HR grade aluminum chips of approximately 1/16" to 3/32" wide, 1/4" long and slightly more than 1/16" thick were used to prepare alumina. The purity of the aluminum was checked on an emission spectograph, which gave the following analysis: 0.004% Fe, 0.005% Cu, 0.005% Mg, 0.02% Si and 0.02% Ca, the rest being aluminum. 60 grams of these aluminum chips were placed in a 5 liter creased Pyrex flask equipped with 2 water condensers and a 6 bladed Pyrex stirrer. The stirrer speed was controlled at 450 R. P. M. 1485 grams of distilled water and 1.32 grams of $HgCl_2$ and 14.85 grams of oxalic acid were added to the flask and the solution was brought up to a temperature of 206.6° F. After 21 hours of stirring at the temperature 99.4% by weight of the aluminum reacted to form a stiff alumina gel.

The alumina gel was decanted and then a 4.8% solution of hydrofluoric acid was added slowly with good mixing in an amount to produce a final catalyst containing 0.20% by weight of combined fluorine. The slurry was evaporated to dryness and dried at 300°–325° F. for approximately 8 hours. The dried alumina was then ground and screened through a 40-mesh screen. The ground alumina was then mixed with Stearotex and pilled and the pills were heated in air up to 932° F., thereby burning out the Stearotex. The pills were then calcined in air at 1202° C. for approximately 3 hours. The alumina-combined fluorine pills were then impregnated with a platinum-containing solution consisting of chloroplatinic acid dissolved in water containing 2 ml. of concentrated ammonium hydroxide per 100 ml. of solution. Enough of this ammoniacal platinum solution was used to produce a final catalyst containing 0.3% platinum by weight. After the impregnation the composite was calcined in air at 932° F. for 3 hours.

This catalyst was used for the reforming of a Mid-Continent straight run naphtha having a boiling range of from 230° F. to 413° F. and an F-1 clear octane number of 34.0 at an average catalyst temperature of about 860° F., a pressure of 500 pounds per square inch, a liquid hourly space velocity of 1.98, and a hydrogen to hydrocarbon mol ratio of 3.25. The analysis of the charge stock and reformed product are shown in the following table:

Table I

| | | |
|---|---|---|
| Initial Boiling Point | 230 | 119 |
| Percent over @ 212° F. + loss in Engler distillation | 0 | 17.5 |
| Dispersion @ 20° C | 73.0 | 112.2 |
| Reid Vapor Pressure | 0 | 5.0 |
| F-1 Clear Octane Number | 34.0 | 85.5 |

It will be noted from the above Table I that the catalyst produced a reformate having a much higher octane number, a greater concentration of aromatics as shown by the dispersion, and a greater degree of volatility.

EXAMPLE II 23.5 g. of aluminum of 99.9+% purity, in the form of the chips described in Example I, were dissolved by reaction with a solution of 168 ml. of 1.29 molar hydrochloric acid containing 0.40 g. mercuric chloride at 99–100° C. during about twenty hours. The product was a stiff white gel which, after separation from the mercury globules which had settled out, was converted to a platinized catalyst as described in Example I. It proved to have the same degree of activity for reforming as the previously described catalyst.

We claim as our invention:

1. A method of preparing a catalyst which comprises reacting aluminum with liquid water in the presence of a mercury promoter in the amount of from about 0.05% to about 50% by weight of said aluminum and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent organic acid anion is below about 1.0, the amount of trivalent acid anion is below about 1.0 and the amount of bivalent inorganic acid anion is below about 0.50, continuing said reaction until an alumina gel is formed and combining therewith a catalytic component selected from the group consisting of the metals and compounds of the metals in group VIII of the periodic table and mixtures thereof.

2. A method of preparing a catalyst which comprises reacting aluminum with liquid water in the presence of a mercury promoter in the amount of from about 0.05% to about 50% by weight of said aluminum and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent organic acid anion is below about 1.0, the amount of trivalent acid anion is below about 1.0 and the amount of bivalent inorganic acid anion is below about 0.50, continuing said reaction until an alumina gel is formed and combining platinum therewith in an amount of from about 0.01% to about 1% by weight of said alumina on a dry basis.

3. A method of preparing a catalyst which comprises reacting aluminum with liquid water in the presence of a mercury promoter in the amount of from about 0.05% to about 50% by weight of said aluminum and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent inorganic acid anion is below about 0.50, the amount of bivalent organic acid anion is below about 1.0 and the amount of trivalent acid anion is below about 1.0, continuing said reaction until an alumina gel is formed, separately recovering alumina therefrom, commingling sufficient halogen acid therewith to introduce halogen in an amount of from about 0.1% to about 8% by weight of said alumina on a dry basis, and combining platinum therewith in an amount of from about 0.01% to about 1% by weight of said alumina on a dry basis.

4. A method of preparing a catalyst which comprises reacting aluminum with liquid water in the presence of a mercury promoter in the amount of from about 0.05% to about 50% by weight of said aluminum, and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent inorganic acid anion is below about 0.50, the amount of bivalent organic acid anion is below about 1.0 and the amount of trivalent acid anion is below about 1.0, continuing said reaction with agitation until an alumina gel is formed, commingling sufficient halogen acid therewith to introduce halogen in an amount of from about 0.1% to about 8% by weight of said alumina on a dry basis and combining platinum therewith in an amount of from about 0.01% to about 1% by weight of said alumina on a dry basis.

5. The method of claim 4 further characterized in that said halogen is fluorine in an amount of from about 0.1% to about 3% by weight of the alumina on a dry basis.

6. The method of claim 4 further characterized in that said halogen is chlorine in an amount of from about 0.1% to about 5% by weight of said alumina on a dry basis.

7. The method of preparing a catalyst which comprises reacting aluminum with water in the presence of a mercury promoter in the amount of from about 0.05% to about 50% by weight of said aluminum and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent inorganic acid anion is below about 0.50, the amount of bivalent organic acid anion is below about 1.0 and the amount of trivalent acid anion is below about 1.0, at a temperature of from about 30° F. to about 705° F., at a pressure sufficient to maintain at least a portion of the water in the liquid phase, continuing said reaction with agitation until an alumina gel is formed, commingling sufficient halogen acid therewith to introduce halogen in an amount of from about 0.1% to about 8% by weight of said alumina on a dry basis, and combining platinum therewith in an amount of from about 0.01% to about 1% by weight of said alumina on a dry basis.

8. The method of preparing a catalyst which comprises reacting aluminum with water in the presence of a mercury promoter in the amount of from about 0.05% to about 50% by weight of said aluminum and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent inorganic acid anion is below about 0.50, the amount of bivalent organic acid anion is below about 1.0 and the amount of trivalent acid anion is below about 1.0, at a temperature of from about 30° F. to about 705° F., at a pressure sufficient to maintain at least a portion of the water in the liquid phase, continuing said reaction with agitation until an alumina gel is formed, commingling sufficient halogen acid therewith to introduce halogen in an amount of from about 0.1% to about 8% by weight of said alumina on a dry basis, calcining said alumina-halogen composite at a temperature of from about 600° F. to about 1600° F., and combining platinum therewith in an amount of from about 0.01% to about 1% by weight of said alumina on a dry basis.

9. The process of claim 8 further characterized in that said mercury promoter is a mercury salt.

10. The process of claim 8 further characterized in that said mercury promoter is an oxide of mercury.

11. The process of claim 8 further characterized in that said halogen is fluorine in an amount of from about 0.1% to about 3% by weight of the alumina on a dry basis.

12. The process of claim 8 further characterized in that said halogen is chlorine in an amount of from about 0.1% to about 5% by weight of said alumina on a dry basis.

13. The method of preparing a catalyst which comprises reacting aluminum with liquid water in the presence of a mercury promoter in the amount of from about 0.05% to about 50% by weight of said aluminum and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent organic acid anion is below about 1.0, the amount of trivalent acid anion is below about 1.0 and the amount of bivalent inorganic acid anion is below about 0.50, continuing said reaction while agitating the mixture until an alumina gel is formed, combining silica therewith, calcining the alumina-silica composite at a temperature of from about 600° F. to about 1800° F. and subsequently combining platinum therewith in an amount of from about 0.01% to about 1% by weight of the final catalyst on a dry basis.

14. The method of preparing a catalyst which comprises reacting aluminum with liquid water in the presence of a mercury promoter in the amount of from about 0.05% to about 50% by weight of said aluminum and an acidic compound selected from the group consisting of inorganic acids, polyvalent organic acids and acid-acting salts in amount so that the amount of monovalent acid anion is below about 0.13 equivalent of acid anion per equivalent of aluminum, the amount of bivalent organic acid anion is below about 1.0, the amount of trivalent acid anion is below about 1.0 and the amount of bivalent inorganic acid anion is below about 0.50, continuing said reaction while agitating the mixture until an alumina gel is formed, calcining the alumina gel at a temperature of from about 600° F. to about 1800° F. and subsequently combining platinum therewith in an amount of from about 0.01% to about 1% by weight of the final catalyst on a dry basis.

15. The method of preparing a catalyst which comprises reacting aluminum with liquid water in the presence of a mercury promoter in the amount of from about 0.05% to about 50% by weight of said aluminum and a dibasic organic acid in amount so that the amount of bivalent organic acid anion is below about 1.0 equivalent of acid anion per equivalent of aluminum, continuing said reaction while agitating the mixture until an alumina gel is formed, calcining the alumina gel at a temperature of from about 600° F. to about 1800° F. and subsequently combining platinum therewith in an amount of from about 0.01% to about 1% by weight of the final catalyst on a dry basis.

16. The method of claim 15 further characterized in that said acid is oxalic acid.

(References on following page)

References Cited in the file of this patent

UNITED STATES PATENTS

| | | | |
|---|---|---|---|
| Re. 22,196 | Heard | | Oct. 6, 1942 |
| 2,274,634 | Heard | | Mar. 3, 1942 |
| 2,449,847 | Heard | | Sept. 21, 1948 |
| 2,471,000 | Messenger | | May 24, 1949 |
| 2,643,935 | Halversen | | June 30, 1953 |
| 2,658,028 | Haensel et al. | | Nov. 3, 1953 |
| 2,659,701 | Heard et al. | | Nov. 17, 1953 |
| 2,667,461 | Guyer et al. | | Jan. 26, 1954 |
| 2,746,842 | Block et al. | | May 22, 1956 |

OTHER REFERENCES

Mellor: "Inorg. Chem.," vol. 5, pages 204–206, and 240–242, published by Longmans, Green and Company, London (1925).